(12) United States Patent
Falk et al.

(10) Patent No.: US 11,368,485 B2
(45) Date of Patent: Jun. 21, 2022

(54) METHOD, APPARATUSES AND COMPUTER PROGRAM PRODUCT FOR MONITORING AN ENCRYPTED CONNECTION IN A NETWORK

(71) Applicant: Siemens Aktiengesellschaft, Munich (DE)

(72) Inventors: Rainer Falk, Poing (DE); Steffen Fries, Baldham (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/045,612

(22) PCT Filed: Apr. 8, 2019

(86) PCT No.: PCT/EP2019/058751
§ 371 (c)(1),
(2) Date: Oct. 6, 2020

(87) PCT Pub. No.: WO2019/197306
PCT Pub. Date: Oct. 17, 2019

(65) Prior Publication Data
US 2021/0168174 A1 Jun. 3, 2021

(30) Foreign Application Priority Data
Apr. 10, 2018 (EP) .................................. 18166542

(51) Int. Cl.
*H04L 29/06* (2006.01)
*H04L 9/40* (2022.01)
(Continued)

(52) U.S. Cl.
CPC ........ *H04L 63/166* (2013.01); *H04L 63/0884* (2013.01); *H04W 12/03* (2021.01);
(Continued)

(58) Field of Classification Search
USPC .......................................................... 713/151
See application file for complete search history.

(56) References Cited

U.S. PATENT DOCUMENTS

2008/0043686 A1* 2/2008 Sperti ................. H04L 63/1408
370/338
2008/0313455 A1 12/2008 Kroeselberg
(Continued)

FOREIGN PATENT DOCUMENTS

| CN | 102461230 A | 5/2012 |
|----|-------------|--------|
| CN | 106060070 A | 10/2016 |

OTHER PUBLICATIONS

C. Rigney: Request for Comments, RFC 2865; http://www.rfc-editor.org/pdfrfc/rfc2865.txt.pdf.
(Continued)

*Primary Examiner* — Fatoumata Traore
*Assistant Examiner* — Samuel Ambaye
(74) *Attorney, Agent, or Firm* — Schmeiser, Olsen & Watts LLP

(57) ABSTRACT

Provided is an arrangement for monitoring, a monitoring device and intermediary device and method for monitoring an encrypted connection between a client and an access point in a network, wherein—an Extensible Authentication Protocol is used for access authentication of the client to the network on an authentication server, and—a transport layer security protocol having a key disclosure function is executed within the Extensible Authentication Protocol, in which security information for the cryptographic protection of the connection is provided to an intermediary device and is transmitted from the intermediary device to a monitoring device for monitoring the connection. Also provided is a computer program product of the same.

13 Claims, 4 Drawing Sheets

(51) Int. Cl.
   *H04W 12/0431* (2021.01)
   *H04W 12/03* (2021.01)
   *H04W 12/06* (2021.01)
   *H04W 12/10* (2021.01)

(52) U.S. Cl.
   CPC ....... *H04W 12/0431* (2021.01); *H04W 12/06* (2013.01); *H04W 12/10* (2013.01)

(56) References Cited

U.S. PATENT DOCUMENTS

| | | |
|---|---|---|
| 2011/0154454 A1 | 6/2011 | Frelechoux |
| 2017/0310486 A1 | 10/2017 | Goldfarb |
| 2018/0198761 A1* | 7/2018 | Naylor ................ H04L 63/0428 |

OTHER PUBLICATIONS

D. Simon: "EAP-TLS" Request for Comments, RFC 5216; http://www.rfc-editor.org/pdfrfc/rfc5216.txt.pdf.

R. Housley: https://tools.ietf.org/html/draft-rhrd-tls-tls13-visibility-00; retrieved Mar. 23, 2018.

https://forum.stanford.edu/events/2016/slides/iot/Judson.pdf; retrieved Mar. 23, 2018.

"3rd Generation Partnership Project; Technical Specification Group Services and System Aspects; 3G security; Lawful interception architecture and functions (Release 15)", 3GPP Standard; Technical Specification; 3GPP TS 33.107, 3rd Generation Partnership Project (3GPP), Mobile Competence Centre; 650, Route Des Lucioles ; F-06921 Sophia-Antipolis Cedex; France, vol. SA WG3, No. V15.1.0, pp. 1-356, XP051450676, gefunden am Mar. 28, 2018, parargraph [0004]; fig. 1e, paragraph [0007]-[7.3.1]; fig. 18, 20; 2018.

http://rnctls.org/documentation.html; retrieved Mar. 3, 2018.

Dierks T et al: "The Transport Layer Security (TLS) Protocol Version 1.2; rfc5246.txt", The Transport Layer Security (TLS) Protocol Version 1.2; RFC5246.TXT, Internet Engineering Task Force, IETF; Standard, Internet Society (ISOC) 4, Rue Des Falaises CH—1205 Geneva, Switzerland, XP015060256; http://www.rfc-editor.org/pdfrfc/rfc5246.txt.pdf; 2008.

V. Fajardo: Request for Comments, RFC 6733; http://www.rfc-editor.org/pdfrfc/rfc6733.txt.pdf Oct. 2012.

PCT International Search Report of International Searching Authority dated Jul. 31, 2019 corresponding to PCT International Application No. PCT/EP2019/058751 filed Apr. 8, 2019.

* cited by examiner

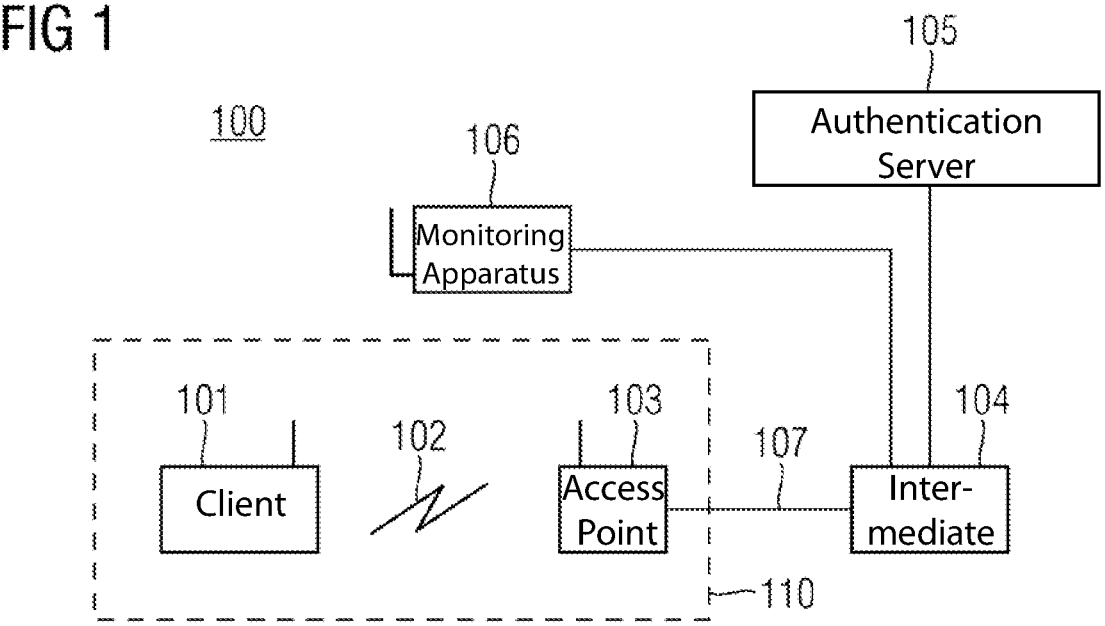
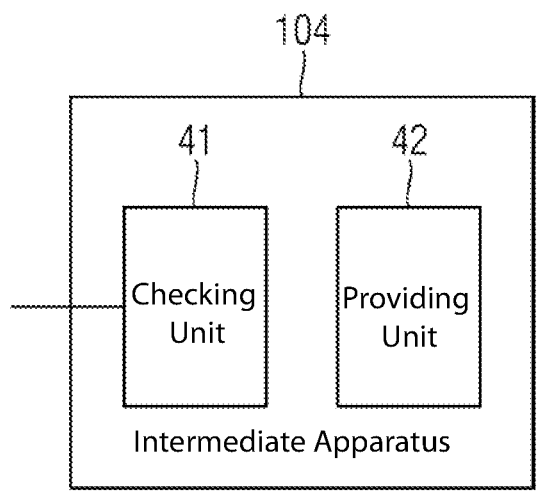
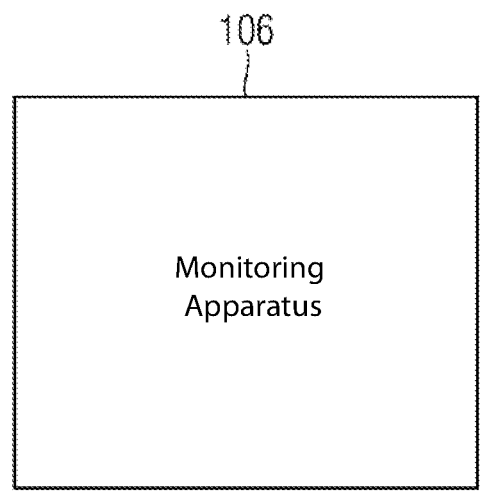

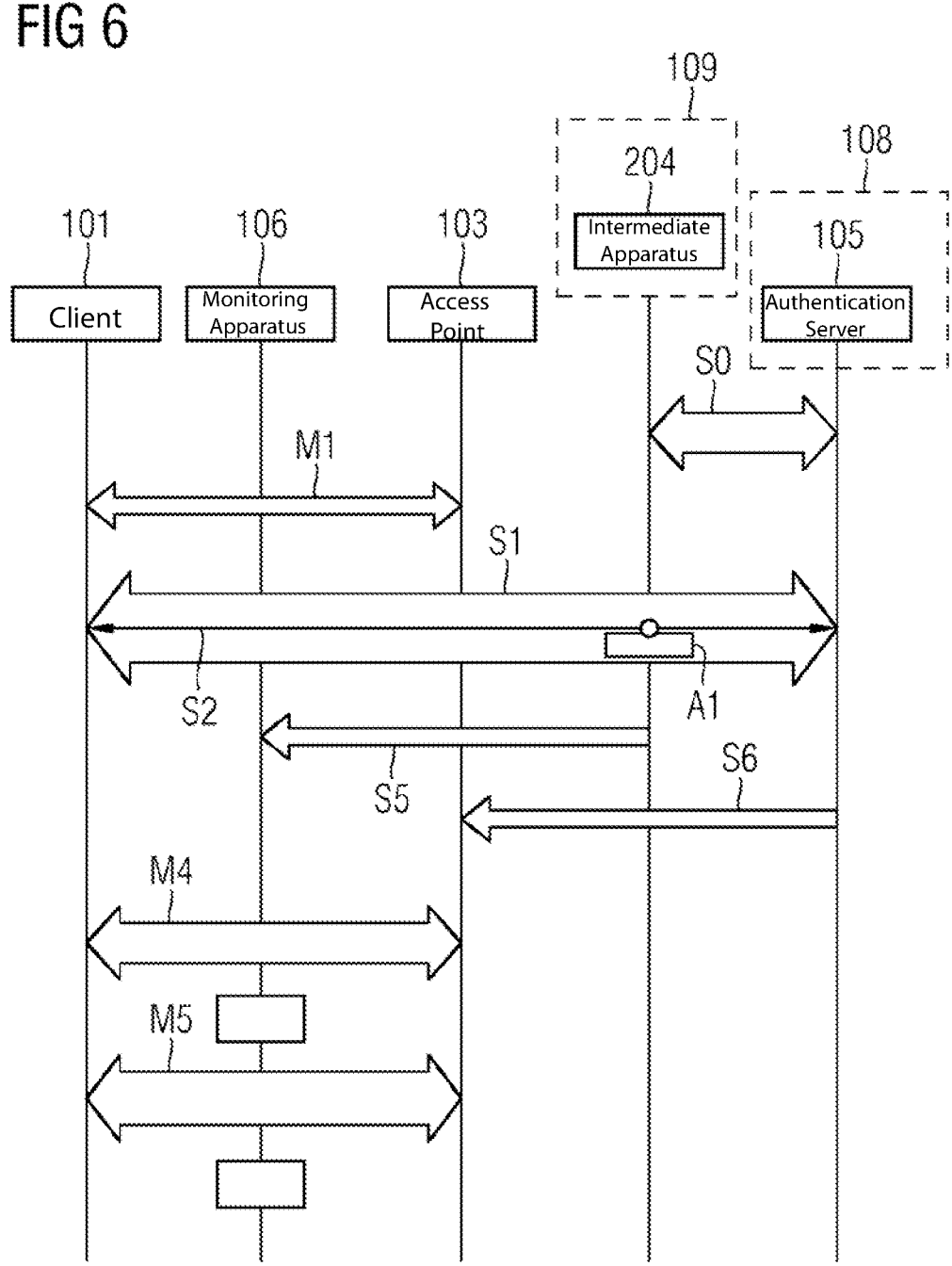

METHOD, APPARATUSES AND COMPUTER PROGRAM PRODUCT FOR MONITORING AN ENCRYPTED CONNECTION IN A NETWORK

CROSS-REFERENCE TO RELATED APPLICATIONS

This application claims priority to PCT Application No. PCT/EP2019/058751, having a filing date of Apr. 8, 2019, which is based on EP Application No. 18166542.3, having a filing date of Apr. 10, 2018, the entire contents both of which are hereby incorporated by reference.

FIELD OF TECHNOLOGY

The following relates to a method, an arrangement, an intermediate apparatus, a monitoring apparatus and a computer program product for monitoring an encrypted connection between a client and an access point in a network.

BACKGROUND

Communication networks, in particular data networks in industrial installations and automation systems, are often used to transmit sensitive control and monitoring data. In order to protect the data during transmission, a security protocol, such as for example secure media access control MACsec or a secure Internet Protocol IPsec/IKEv2 or in particular a transport layer security protocol TLS or else a datagram transport layer security protocol DTLS, is used, for example. The authenticity of the communication partner is checked in this case and, depending on the configuration of the protocol, manipulation and/or tapping of the communication connection is prevented. This is accomplished, for the most part during connection setup, by negotiating cryptographic key material, in particular a session key, and a cipher method, also referred to as cipher suite, which are used to protect the integrity of and/or to encrypt the transmitted data.

On the other hand, however, there is also the requirement to monitor the communication network for example in order to be able to diagnose a malfunction or erroneous administration. In some applications, there is also the requirement to record control communication in a "black box recorder" or "juridical recorder" in order to be able to shed light on the circumstances of loss in the event of an accident. There may also be the requirement to document the flow of a production process or to detect network-based attacks on an automation system. This can necessitate decrypting an encrypted data communication or checking cryptographic checksums of an integrity-protected data communication. There is therefore a need, in particular in industrial automation systems and control installations, to monitor cryptographically protected and in particular encrypted communication connections.

Key disclosure functions are known generally. These involve a node providing an encryption key to a third party, so that the latter can decrypt the data traffic. As such, for example a multi-context transport layer security protocol mcTLS is known. The connection setup in this case involves the TLS protocol being used to signal the presence of one or more intermediate nodes to the communication partners. Session key material agreed between the communication partners is provided to the intermediate node(s). The multi-context TLS protocol is an extension of the TLS protocol according to IETF RFC 5246 and is described for example on the Internet at the address http://mctls.org/documentation.html.

Furthermore, a transport layer security protocol with a rotate and release function TLS-RaR is known, which involves a separate connection being set up from a communication partner to a key publication server. This involves the key from the last communication period after a key update being sent to the key publication server on the communication connection between the two communication partners, and hence delayed monitoring of the data traffic on the communication connection being rendered possible. A TLS protocol with a rotate and release function TLS-RaR is described for example on the Internet at the address: https://forum.stanford.edu/events/2016/slides/iot/Judson.pdf.

Furthermore, a transport layer security protocol with a visibility extension TLS VE is known. This extension can be used by the communication partners, that is to say a TLS client and a TLS server, to explicitly provide access to a session context of the TLS connection and thereby to allow an authorized node to monitor the TLS connection. The TLS protocol with a visibility extension is specified by the IETF and is described for example at the address https://tools.ietf.org/html/draft-rhrd-tls-tls13-visibility-00.

An extensible authentication protocol EAP is known, which is used by a subscriber to authenticate itself to a network and also by the network to authenticate itself to the subscriber. The EAP protocol can be used to transmit different authentication methods. An extensible authentication protocol for a transport layer security authentication protocol EAP-TLS is specified by the Internet Engineering Task Force IETF as Request for Comments RFC 5216. Besides authentication of the subscribers, the EAP-TLS protocol can also be used to negotiate one or more pieces of security information, such as for example keys for protecting a network access communication. This is typically effected between a communication subscriber and an authentication server, for example a RADIUS/DIAMETER server.

Wireless transmission technologies such as for example WLAN according to an IEEE 802.11 standard or a WiMax Forum standard and cellular mobile radio according to a Long Term Evolution LTE or 5G standard of the 3rd Generation Partnership Project 3GPP are increasingly used in industrial installations to provide a wireless network. Similarly, wired transmission technologies, in particular Ethernet or Profinet, are also used.

US 2008/043686 A1 describes a method for detecting attacks in a wireless data communication network. This is accomplished by deducing a network state from the monitored wireless traffic. Trusted information pertaining to the state of the wireless network is provided by an authentication server, for example. The trusted information is for example a type of an extensible authentication protocol (EAP), which type is negotiated between the authentication server and a mobile station, a state of the mobile station or EAP-type-specific parameters.

The known key disclosure methods require specific network protocols and network interfaces and are therefore usable only in networks provided specifically for the purpose.

SUMMARY

An aspect relates to monitoring an encrypted communication connection between a device or, generally, client and a network, which in particular exhibits an encrypted connection, without specific adaptation of the network protocols and network interfaces.

According to a first aspect, embodiments of the invention relates to a method for monitoring an encrypted connection between a client and an access point in a network, wherein an extensible authentication protocol EAP is used for an authentication of the client for access to the network on an authentication server, and a transport layer security protocol with a key disclosure function (EAP-kdTLS) is executed within the extensible authentication protocol, which involves security information for cryptographically protecting the connection being provided to an intermediate apparatus and being transmitted from the intermediate apparatus to a monitoring apparatus for the purpose of monitoring the connection.

This has the advantage that merely the use of a specific authentication protocol by an extensible authentication protocol EAP, which is generally supported by a device and an authentication server, allows the encrypted communication on the connection to be tapped, the tapped data being able to be analyzed in plain text by the intermediate device. Components of a network, for example according to a WLAN or WiMax or 5G standard or 802.1X/MACsec, do not need to be adapted if they support network access authentication according to an extensible authentication protocol. The extensible authentication protocol is already used in many networks, in particular including radio networks, and is therefore available in the client and in the authentication server. The access authentication can therefore be tapped by a third party by the monitoring apparatus on the basis of the extensible authentication protocol and the transport layer security protocol with a key disclosure function (EAP-kdTLS) executed within the extensible authentication protocol. This allows the subsequent payload data traffic on the connection to be tapped irrespective of a key distribution according to a RADIUS/DIAMETER specification, for example. The monitoring of the access authentication for the client on the authentication server ascertains the security information, in particular key material, that is used to cryptographically protect subsequent key agreement messages for a payload data connection on the connection. It is therefore in turn possible to ascertain traffic key material, for example a session key, and hence to decrypt and monitor the encrypted payload data traffic on the connection.

In an advantageous embodiment, a transport layer security protocol TLS with a key disclosure function is a multi-context TLS protocol or a TLS protocol with a visibility extension or a TLS protocol with a rotate and release function.

These TLS protocols with a key disclosure function have the advantage of being already available. The client and the authentication server can therefore be equipped with this function without significant additional development outlay.

In an advantageous embodiment, the security information is checked in the intermediate apparatus and forwarded to the access point.

In an advantageous embodiment, the security information itself or second security information derived from the security information is ascertained by the intermediate apparatus and is provided to the monitoring apparatus for the purpose of monitoring the connection.

If a derived cryptographic key is ascertained from the security information by a derivation function, then the derivation function used therefor needs to correspond to that derivation function at the access point that is used therein for deriving the cryptographic key. These two derived keys need to correspond to one another. The check in the intermediate apparatus can ensure this. As a result, it is possible to check that the derived key used for protecting the communication is actually the one disclosed by the security information. The ascertained security information may be in particular a master session key MSK, an extended master session key EMSK, an application master session key AMSK. A cryptographic key derived from the security information may therefore be a key formed on the basis of the session keys.

In an advantageous embodiment, the security information is provided only to a monitoring apparatus authenticated and/or authorized by the authentication server.

This has the advantage that only checked and authorized monitoring apparatuses receive the security information.

In an advantageous embodiment, the security information is provided to the monitoring apparatus by the intermediate apparatus in delayed fashion.

This has the advantage that particularly security-critical data on the connection cannot be ascertained immediately or in real time, but rather a delay allows the ascertainment of security-critical data to be delayed until no damage can result therefrom.

In an advantageous embodiment, the security information is provided to the monitoring apparatus by the intermediate apparatus via a cryptographically protected connection.

This has the advantage that the security information cannot be received by an unauthorized third party posing as a monitoring apparatus.

In an advantageous embodiment, a public key of the client and/or of the authentication server that was validated during the authentication for access to the network is used for encryption and for monitoring the integrity of the cryptographically protected connection between the intermediate apparatus and the monitoring apparatus.

This has the advantage that protection of the transmission of the security information does not require an additional key to be managed.

In an advantageous embodiment, key distribution messages and/or key agreement messages transmitted via the connection in protected fashion are decrypted by the monitoring apparatus by the security information, and traffic session keys that the messages contain, which are used for cryptographically protecting payload data, are ascertained.

In an advantageous embodiment, payload data decrypted by the traffic session key are checked with respect to a monitoring guideline, and an alarm is provided by the monitoring apparatus or further measures, in accordance with a security guideline, are taken if the monitoring guideline is violated.

This has the advantage that the payload data transmitted via the connection can be actively analyzed and further measures can be prompted by an alarm.

According to a second aspect, embodiments of the invention relates to an arrangement for monitoring an encrypted connection between a client and an access point in a network, comprising a client and an authentication server, which are designed to use an extensible authentication protocol EAP for an authentication of the client for access to the network and to execute a transport layer security TLS protocol with a key disclosure function within the extensible authentication protocol EAP, an intermediate apparatus, which is designed to receive security information from the authentication server, and a monitoring apparatus, which is designed to receive the security information from the intermediate apparatus for the purpose of monitoring the connection.

The arrangement according to embodiments of the invention allow payload data transmitted in encrypted fashion via the connection, in particular in the case of a WLAN, WiMax or in the case of a 5G mobile radio network, to be decrypted and hence monitored merely by using the extensible authentication protocol with the transport layer security protocol with a key disclosure function. There is no requirement in this case to adapt the mobile radio or wireless components, such as for example the access point or further radio access nodes in a wireless network, specifically for this purpose.

In an advantageous embodiment, a relationship of trust is formed between the intermediate apparatus and the authentication server.

Such a relationship of trust may exist for example as a result of the operation of the intermediate apparatus and the authentication server by a common operator that supervises both components and similarly supervises a communication connection between the intermediate apparatus and the authentication server and operates the communication connection in manipulation-proof fashion. A relationship of trust may alternatively be formed by virtue of an authentication of the intermediate apparatus on the authentication server or a reciprocal authentication of the intermediate apparatus and the authentication server.

In an advantageous embodiment, the intermediate apparatus is in the form of an authentication proxy that is assigned with the authentication server to a first network zone, or the intermediate apparatus is assigned to a second network zone, which is different than the first network zone to which the authentication server is assigned.

In case of an authentication proxy, a relationship of trust normally exists as a result of the operation of the authentication proxy and the authentication server in a common first network zone in which the authenticity and transmission of data between the authentication proxy and the authentication server is assured. If the intermediate apparatus is produced in a second network zone but the authentication server is produced in a first network zone, this allows the negotiated security information to be accessed independently of a network provider of the first network zone, the security information subsequently being used to protect the network access.

According to a third aspect, embodiments of the invention relate to an intermediate apparatus for monitoring an encrypted connection between a client and an access point in a network, comprising a checking unit, which is designed to check and forward security information, and a providing unit, which is designed to ascertain the security information itself or second security information derived from the security information and to provide the information for the purpose of monitoring the connection. The intermediate apparatus is moreover designed to perform the method described.

According to a fourth aspect, embodiments of the invention relate to a monitoring apparatus for monitoring an encrypted connection between a client and an access point in a network, which monitoring apparatus is designed to receive security information and to use the security information to decrypt key distribution messages and/or key agreement messages transmitted via the connection in protected fashion and to ascertain traffic session keys that the messages contain, which are used for cryptographically protecting payload data, and to use the traffic session keys for decrypting the payload data.

According to a fifth aspect, embodiments of the invention relate to a computer program product (non-transitory computer readable storage medium having instructions, which when executed by a processor, perform actions) loadable directly into the memory of one or more digital computers, comprising program code parts suitable for performing the steps of the method.

BRIEF DESCRIPTION

Some of the embodiments will be described in detail, with reference to the following figures, wherein like designations denote like members, wherein:

FIG. 1 shows an exemplary embodiment of an arrangement for monitoring an encrypted connection between a client and an access point in a network in a schematic diagram;

FIG. 2 shows an exemplary embodiment of an intermediate apparatus in a block diagram;

FIG. 3 shows an exemplary embodiment of a monitoring apparatus in a block diagram;

FIG. 6 shows a second exemplary embodiment of the method in the form of a flow diagram.

DETAILED DESCRIPTION

Figure 4:
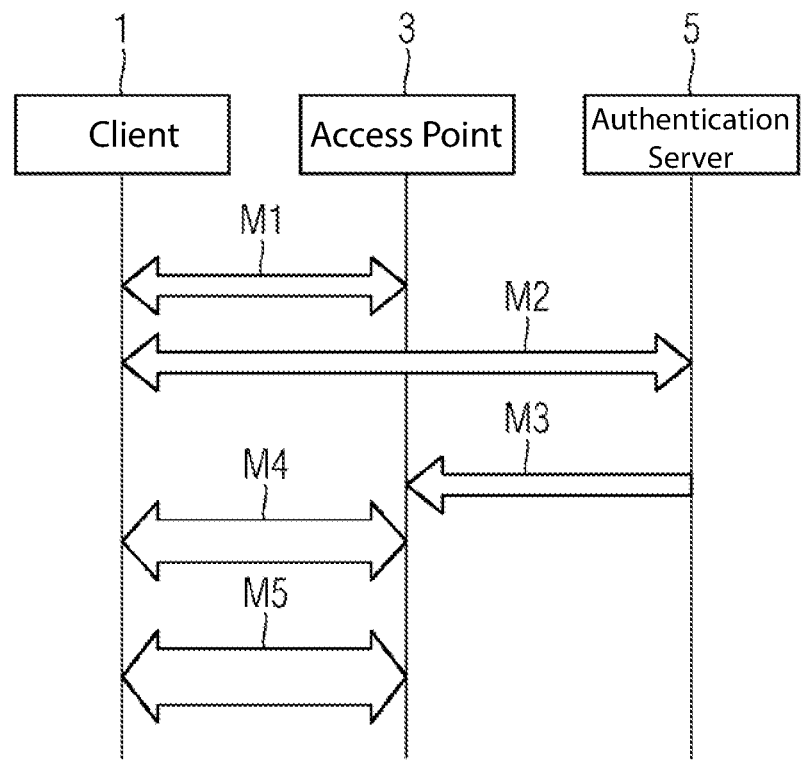
FIG. 4 shows an authentication in a network in accordance with the conventional art in the form of a flow diagram.

FIG. 1 shows an arrangement for monitoring an encrypted connection 102, in particular a wireless connection, between a client 101 and an access point 103 in a local area network 110. The client 1 is for example a device that uses the local area network 110 to communicate with other devices, control, diagnosis or monitoring apparatuses. The device can be for example a field device of an automation installation, an apparatus in a power generation or power distribution installation, or else an apparatus in an office network or generally a subscriber of a communication or data network in which the local area network 110 is in the form of an access network. The access point 103 is for example in the form of an access point according to a WLAN standard. Encryption is understood in this case to mean cryptographic protection of the connection. This can involve the confidentiality and/or integrity of the transmitted data being protected. In the event of encrypted transmission of payload data, e.g. control data or sensor data, the payload data can be decrypted only if the cryptographic key used is available. If payload data are transmitted in integrity-protected fashion, the cryptographic checksums protecting the integrity (message authentication code) can be checked only if the cryptographic key used is available.

The arrangement 100 furthermore comprises an authentication server 105, which is designed to perform access authentication for the client 101 on the local area network. An intermediate apparatus 104 is assigned to the authentication server 5 and connected to the access point 103. A monitoring apparatus 106 is connected to the intermediate apparatus 104. The connections between the access point 103 and the intermediate apparatus 104 and between the intermediate apparatus 104 and the authentication server 105 and between the access point 103 and the monitoring unit 106 may be a direct or indirect connection to intermediate nodes. The connections may be in the form of wired or wireless connections. The connection 102 between the client 101 and the access point 103 is for example in the form of a wireless connection according to the WLAN standard IEEE 802.11 of the Institute of Electrical and Electronics Engineers. The connection 102 may alternatively be in the form of a wired connection designed for example using a secure media access control protocol according to IEEE 802.1ae (MACsec). The connection may also be a mobile-radio-based network. This can be accomplished by using e.g. a 5G radio access technology (3GPP 5G New Radio) as WLAN radio technology in a private radio network, or a virtual local area network can be implemented by a mobile radio network (e.g. MulteFire, mobile virtual private LAN service, LAN support in 5G).

Access authentication for the client 101 on the authentication server 105 is accomplished by using an extensible authentication protocol, subsequently also referred to as EAP for short, which the client 101 uses to authenticate itself to the authentication server. The EAP protocol is used in particular as an EAP-TLS protocol with a key disclosure function (EAP-kdTLS). Besides authentication of the client 101, this EAP-kdTLS protocol is used to negotiate one or more pieces of security information, in particular session keys for protecting the network access communication, for example for setting up a protected payload data connection via the connection 102.

FIG. 2 depicts an exemplary embodiment of an intermediate apparatus 104. The intermediate apparatus comprises a checking unit 41, which is designed to check and forward the security information. The intermediate apparatus furthermore comprises a providing unit 42, which is designed to ascertain the security information itself or second security information derived from the security information and to provide the information for the purpose of monitoring the connection 102.

FIG. 3 shows an exemplary embodiment of a monitoring apparatus 106. The monitoring apparatus 106 is designed to receive the security information and to use the security information to decrypt key distribution messages and/or key agreement messages transmitted via the local connection in protected fashion and to ascertain traffic session keys that the messages contain, which are used for cryptographically protecting payload data, and to use the traffic session keys for decrypting the payload data or for checking cryptographic checksums of the payload data.

FIG. 4 shows an authentication of a client 1 and an access point 3 in a local area network on an authentication server 5 according to the conventional EAP-TLS protocol. In a first step M1, a transmission connection is set up between the client 1 and the access point 3 according to a layer 3 of an ITU/ISO OSI model. In method step M2, the client 1 uses the EAP-TLS protocol to authenticate itself on the authentication server 5. The authentication server 5 can operate for example according to a Radius protocol or a Diameter protocol according to IETF standard RFC 2865 or RFC 6733.

Following a successful authentication of the client 1, the authentication server 5 transmits security information for the cryptographically protected transmission of data on the connection between the client 1 and the access point 3, see M3.

This security information comprises for example one or more keys, for example a master session key MSK or an extended master session key EMSK. The at least one piece of security information is then used to encrypt and/or check key distribution messages and key agreement messages for example for a 4-way handshake for a WLAN connection setup, see method step M4. This message exchange is therefore encrypted or cryptographically protected and not readable or manipulable by a third party. The connection setup in step M4 then involves traffic session keys TSK being ascertained, which are used in method step M5 for the purpose of encrypted and/or integrity-protected data interchange of payload data.

Figure 5:
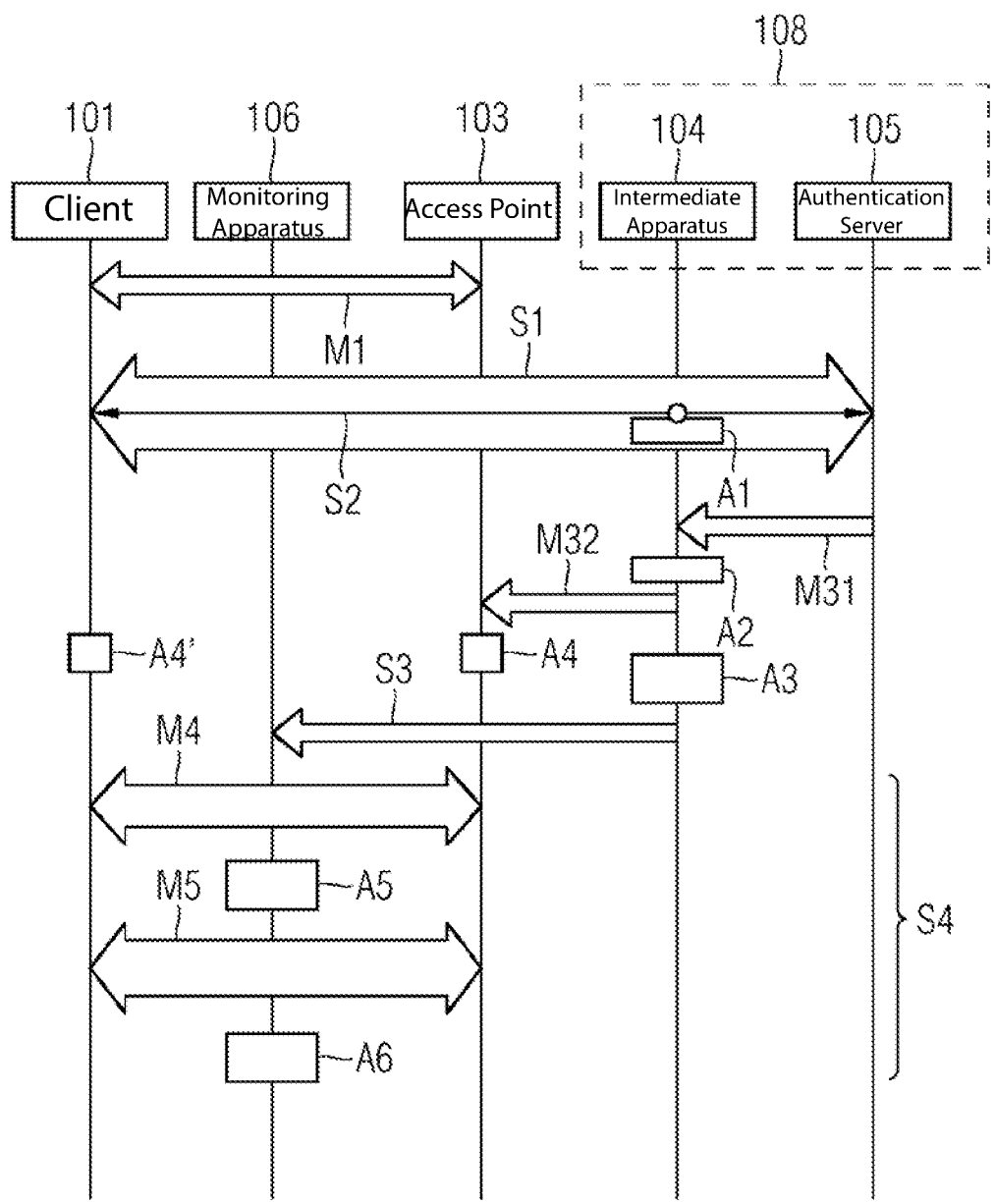
FIG. 5 shows a first exemplary embodiment of the method in the form of a flow diagram.

FIG. 5 now shows an exemplary embodiment of the method according to the invention using a schematic message flow diagram between the components of the arrangement depicted in FIG. 1. After setup of a connection between the client 101 and the access point 103, see M1, an extensible authentication protocol EAP, see S1, in an instance for transport layer security protocols with a key disclosure function is then used between the client 101 and the authentication server 105 for the purpose of authenticating the client 101 for access to the network, see S2. This involves the security information that is used for protecting the further network access communication M4 between the client 101 and the access point 103 and was negotiated between the client 101 and the authentication server 105 also being provided to the intermediate apparatus 104, see A1. Transport layer security protocols with a key disclosure function are subsequently also referred to as kdTLS protocols for short below. The kdTLS protocol may be for example the aforementioned multi-context TLS protocol or a TLS protocol with a visibility extension or a TLS protocol with a rotate and release function. Each of these kdTLS protocols involves the security information negotiated between the client 101 and the authentication server 105 being provided to the intermediate apparatus 104. The security information is for example a master session key MSK or an extended master session key EMSK.

In method step M31, the intermediate apparatus 104 receives the security information from the authentication server 105. The intermediate apparatus 104 checks the security information ascertained from the extensible authentication protocol for a transport layer security protocol with a key disclosure function, referred to as EAP-kdTLS for short, using the security information received from the authentication server 105, see A2. The security information comprises not only for example key material but also further key and connection parameters, which are compared during the check. The key information received from the authentication server 105 is forwarded to the access point 103, see M32. In the access point 103 and in the client 101, the security information actually used for the further communication on the connection 102 is created from the security information and the included key and connection parameters, see A4, A4'. The further communication between the client 101 and the access point 103 is then encrypted using this security information, see M4.

In parallel therewith, the intermediate apparatus 104 ascertains the security information used on the connection 102, see A3. The security information used may be either the security information itself received from the authentication server 105 or second security information derived from the security information on the basis of the key and connection parameters. The intermediate apparatus 104 transmits the security information or the derived second security information to the monitoring apparatus 106, see S3.

The monitoring apparatus 106 then monitors the connection 102 between the client 101 and the access point 103, uses the security information to decrypt or check for example messages of a WLAN 4-way handshake protocol and ascertains a traffic session key TSK negotiated in the process, see A5. The traffic session key is used to encrypt a communication, protected by this traffic session key TSK, between the client 101 and the access point 103, see M5.

The payload data transmission encrypted in this manner on the connection 102 can therefore be decrypted and monitored by the monitoring apparatus 104. Additionally, the monitoring apparatus 106 can check the payload data decrypted via the connection 102 with respect to a monitoring guideline and provide an alarm signal if the monitoring guideline is violated, see A6.

The monitoring apparatus 106 therefore decrypts or checks key agreement messages and/or key distribution messages exchanged between the client 101 and the access point 103 during connection setup, and ascertains traffic session keys contained therein or negotiated that are used for cryptographically protecting payload data.

The security information is provided only to an authenticated and authorized monitoring apparatus 106. The monitoring apparatus 106 can be authenticated or authorized for example by an authentication of the monitoring apparatus 106 on the authentication server 105. The monitoring apparatus 106 can also authenticate itself to another component, e.g. a client component or an intermediate apparatus component, however. A confirmation of the authorization of the monitoring apparatus 106 is then provided to the authentication server 105.

The security information can also be provided to the monitoring apparatus 106 by the intermediate apparatus 104 in delayed fashion. In a variant, the security information is provided to the monitoring apparatus 106 by the intermediate apparatus 104 via a cryptographically protected connection, see connection 107 in FIG. 1. In this case, the security information is transmitted in encrypted and/or integrity-protected fashion. To encrypt and/or monitor the integrity of the cryptographically protected connection 107, a public key of the client 101 and/or of the authentication server 105 is used. It is therefore possible to monitor the connection 102 between the client 101 and the access point 103, see S4 in FIG. 5, fully.

The authentication server 105 and the intermediate apparatus 104 are in a relationship of trust with one another in order to guarantee secure and trusted handling and transmission of the key information M31. The intermediate apparatus 104 may be in the form of an authentication proxy, for example, which, together with the authentication server 105, belongs to a common network zone. This first network zone, depicted by the dashed line 108 in FIG. 5, is operated by a network operator, for example.

FIG. 6 shows an arrangement for monitoring the encrypted connection 102 between the client 101 and the access point 103, wherein an intermediate apparatus 204 is arranged in a second network zone 109, which is different than the first network zone 108 to which the authentication server 105 is assigned. In such an arrangement, a relationship of trust is formed between the intermediate apparatus 204 and the authentication server 105 in method step S0. By way of example, this can be accomplished by an authentication of the intermediate apparatus 204 on the authentication server 105. It is alternatively possible to identify the intermediate apparatus 204 of a further component that is not part of the authentication infrastructure of the first network zone 108. This authentication information is available to the authentication server.

This allows the negotiated key information to be accessed independently of the network operator of the first network zone, see A1, the key information subsequently being used to protect the network access. The intermediate component 204 provides the security information containing key and connection parameters to the monitoring apparatus 106, see S5. The security information is transmitted between the intermediate apparatus 204 and the monitoring apparatus 106 in particular by a protected connection, for example by a TLS connection or an IPsec connection. This can be accomplished in particular using a public key of the monitoring apparatus 106. In this variant, the authentication server 105 provides the security information or second security information derived from the security information to the access point 103, see S6. The further sequences depicted in FIG. 6 correspond to the sequences described for FIG. 5.

A transmission, in particular a wireless transmission, of control data between a client and an access point can therefore be monitored without needing to specifically adapt existing network infrastructure, in particular the client 101 and the access point 103.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for monitoring an encrypted wireless connection between a client and an access point in a network, comprising:
using an extensible authentication protocol for an authentication of the client for access to the network on an authentication server, and
executing a transport layer security protocol with key disclosure within the extensible authentication protocol, wherein security information for cryptographically protecting the wireless connection between a client and an access point is provided to an intermediate apparatus from the authentication server and is transmitted from the intermediate apparatus to a monitoring apparatus for the purpose of monitoring the wireless connection, wherein the transport layer security protocol TLS with key disclosure is a multi-context TLS transport layer security protocol or a TLS transport layer security protocol with a visibility extension or a TLS transport layer security protocol with a rotate and release function TLS-RaR,
wherein at least one of key distribution messages and key agreement messages transmitted via the wireless connection in protected fashion are decrypted by the monitoring apparatus by the security information, and traffic session keys that said messages contain, which are used for cryptographically protecting payload data, are ascertained.

2. The method as claimed in claim 1, wherein the security information is checked in the intermediate apparatus and forwarded to the access point.

3. The method as claimed in claim 1, wherein the security information itself or second security information derived from the security information is ascertained by the intermediate apparatus and is provided to the monitoring apparatus for the purpose of monitoring the wireless connection.

4. The method as claimed in claim 1, wherein the security information is provided only to a monitoring apparatus at least one of authenticated and authorized by the authentication server.

5. The method as claimed in claim 1, wherein the security information is provided to the monitoring apparatus by the intermediate apparatus in delayed fashion.

6. The method as claimed in claim 1, wherein the security information is provided to the monitoring apparatus by the intermediate apparatus via a cryptographically protected connection.

7. The method as claimed in claim 6, wherein a public key of at least one of the client and the authentication server that was validated during the authentication for access to the network is used for at least one of encryption and monitoring the integrity of the cryptographically protected connection.

8. The method as claimed in claim 1, wherein payload data decrypted by the traffic session key are checked with respect to a monitoring guideline, and an alarm is provided by the monitoring apparatus if the monitoring guideline is violated.

9. A computer program product, comprising a computer readable hardware storage device having computer readable program code stored therein, said program code executable by a processor of a computer system to implement a method loadable directly into a memory of one or more digital computers, comprising program code parts suitable for performing the steps of the method as claimed in claim 1.

10. An arrangement for monitoring an encrypted wireless connection between a client and an access point in a network, comprising:
 a client and an authentication server, which are configured to use an extensible authentication protocol for an authentication of the client for access to the local area network and to execute a transport layer security protocol with key disclosure within the extensible authentication protocol, which involves security information for cryptographically protecting the wireless connection between a client and an access point being provided to an intermediate apparatus,
 an intermediate apparatus, which is designed to receive the security information from the authentication server, and
 a monitoring apparatus, which is designed to receive the security information from the intermediate apparatus for the purpose of monitoring the wireless connection, wherein the transport layer security protocol TLS with key disclosure is a multi-context TLS transport layer security protocol or a TLS transport layer security protocol with a visibility extension or a TLS transport layer security protocol with a rotate and release function TLS-RaR,
wherein at least one of key distribution messages and key agreement messages transmitted via the wireless connection in protected fashion are decrypted by the monitoring apparatus by the security information, and traffic session keys that said messages contain, which are used for cryptographically protecting payload data, are ascertained.

11. The arrangement as claimed in claim 10, wherein the arrangement is designed to monitor the encrypted wireless connection between the client and the access point.

12. The arrangement as claimed in claim 10, wherein a relationship of trust is formed between the intermediate apparatus and the authentication server.

13. The arrangement as claimed in claim 10, wherein the intermediate apparatus is in the form of an authentication proxy that is assigned with the authentication server to a first network zone, or wherein the intermediate apparatus is assigned to a different, second, network zone than an authentication server.

\* \* \* \* \*